US007869713B2

(12) United States Patent
Porzi et al.

(10) Patent No.: US 7,869,713 B2
(45) Date of Patent: Jan. 11, 2011

(54) MULTIPLEXER WITH APTICAL ADD/DROP

(75) Inventors: Claudio Porzi, Civitavecchia (IT);
Antonella Bogoni, Montova (IT); Luca Poti, Pisa (IT)

(73) Assignee: Ericsson AB, Stockholm (SE)

( * ) Notice: Subject to any disclaimer, the term of this patent is extended or adjusted under 35 U.S.C. 154(b) by 552 days.

(21) Appl. No.: 11/720,667

(22) PCT Filed: Nov. 28, 2005

(86) PCT No.: PCT/EP2005/056272

§ 371 (c)(1),
(2), (4) Date: Dec. 20, 2007

(87) PCT Pub. No.: WO2006/058874

PCT Pub. Date: Jun. 8, 2006

(65) Prior Publication Data

US 2009/0269070 A1    Oct. 29, 2009

(51) Int. Cl.
*H04B 10/00* (2006.01)
(52) U.S. Cl. .......................... 398/98; 398/101; 398/52; 398/83
(58) Field of Classification Search ............ 398/79–103
See application file for complete search history.

(56) References Cited

U.S. PATENT DOCUMENTS 5,457,559 A * 10/1995 Saito et al. .................... 398/98
5,805,327 A *  9/1998 Usami et al. ................ 359/244
5,959,764 A *  9/1999 Edagawa et al. ............ 359/326
6,091,536 A *  7/2000 Usami et al. ................ 359/244
6,169,625 B1 * 1/2001 Watanabe et al. ........... 359/244
6,266,179 B1 * 7/2001 Nakamoto .................. 359/330

(Continued)

FOREIGN PATENT DOCUMENTS

DE    10137874    2/2003

(Continued)

OTHER PUBLICATIONS

Chou, Hsu-Fen, et al. "Compact 160-Gb/s Add-Drop Multiplexer with a 40-Gb/s Base Rate Using Electroabsorption Modulators." IEE Photonics Technology Letters, vol. 16, No. 6, Jun. 2004, pp. 1564-1566.

(Continued)

*Primary Examiner*—Agustin Bello
(74) *Attorney, Agent, or Firm*—Coats & Bennett, P.L.L.C.

(57)    ABSTRACT

A method of extracting a predetermined channel from an OTDM signal includes the steps of combining at the inlet of an SOA the OTDM signal and an impulsive signal with impulses temporally synchronized with the channel to be extracted to produce in the SOA FWM, XGM and XPM effects which shift to a length c the channel chosen for extraction with c outside the length d of the OTDM signal with the other channels outlet from the SOA and filtering the SOA outlet to extract components with c d that represent respectively the desired channel and the cleaned OTDM signal. A multiplexer in accordance with the method includes an inlet (14) of an OTDM signal sent to an SOA (24) together with an appropriate impulsive signal. The SOA outlet is filtered by filters (28, 29) to obtain the signal of the extracted channel (16) and the cleaned OTDM signal (15).

14 Claims, 4 Drawing Sheets

U.S. PATENT DOCUMENTS

Figure 1:
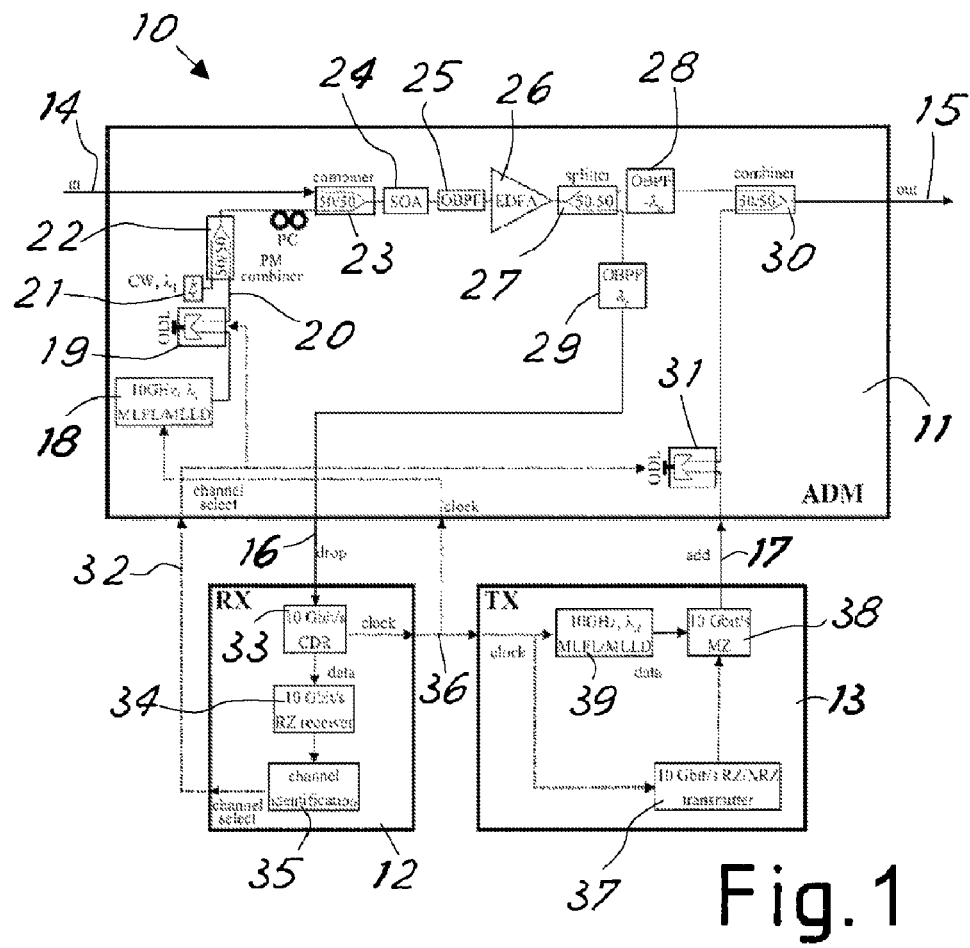

| | | | | |
|---|---|---|---|---|
| 6,307,658 | B1* | 10/2001 | Chiaroni et al. | 398/183 |
| 6,377,388 | B1* | 4/2002 | Sakata et al. | 359/321 |
| 6,532,091 | B1* | 3/2003 | Miyazaki et al. | 398/175 |
| 6,549,314 | B1* | 4/2003 | Yamaguchi | 398/68 |
| 6,661,549 | B1* | 12/2003 | Calvani et al. | 398/98 |
| 6,728,019 | B2* | 4/2004 | Usami et al. | 359/248 |
| 6,775,478 | B2* | 8/2004 | Suzuki et al. | 398/75 |
| 6,775,482 | B1* | 8/2004 | Shimomura et al. | 398/183 |
| 6,842,565 | B2* | 1/2005 | Ohara et al. | 385/24 |
| 7,092,145 | B2* | 8/2006 | Takagi | 359/326 |
| 7,116,914 | B2* | 10/2006 | Otani et al. | 398/175 |
| 7,260,331 | B2* | 8/2007 | Miyazaki | 398/176 |
| 7,769,358 | B2* | 8/2010 | Sasaki et al. | 455/276.1 |
| 2002/0196498 | A1* | 12/2002 | Watanabe et al. | 359/135 |
| 2004/0109691 | A1* | 6/2004 | Miyazaki | 398/98 |
| 2005/0047788 | A1* | 3/2005 | Miyazaki | 398/85 |

FOREIGN PATENT DOCUMENTS

| | | |
|---|---|---|
| JP | 05061078 A | 3/1993 |
| JP | 05188411 A | 7/1993 |
| JP | 20011244885 A | 9/2001 |

OTHER PUBLICATIONS

Duelk, M. et al. "Full 40 Gbit/s OTDM to WDM Conversion: Simultaneous Four Channel 40:10 Gbit/s All-Optical Demulitplexing and Wavelength Conversion to Individual Wavelengths." OFC/IOOC '99 Optical Fiber Communication Conference/Internatinal Conference on Integrated Optics and Optical Fiber Communication. San Diego, CA, Feb. 21-26, 1999, pp. PD17-1-PD17-3.

Fischer, St. et al. "All-Optical Regenerative OTDM Add-Drop Multiplexing at 40 Gb/s Using Monolithic InP Mach-Zehnder Interferometer." IEEE Photonics Technology Letters, vol. 12, No. 3, Mar. 2000, pp. 335-337.

Li, Jie, et al. "OTDM Add-Drop Multiplexer Based on XPM-Induced Wavelength Shifting in Highly Nonlinear Fiber." Journal of Lightwave Technology, vol. 23, No. 9, Sep. 2005, pp. 2654-2661.

Rau, Lavanya et al. "All-Optical Add-Drop of an OTDM Channel Using an Ultra-Fast Fiber Based Wavelength Converter." Optical Fiber Communication Conference and Exhibit, Technical Digest, Postconference Digest. Anaheim, CA, Mar. 17-22, 2002, pp. 259-261.

Tangdiongga, E. et al. "160 Gbit/s OTDM Add-Drop Networking Using 275 km Installed Fibres." Electronics Letters, vol. 40., No. 9, Apr. 29, 2004.

Turkiewicz, J.P. et al. "Simultaneous High Speed OTDM Add-Drop Multiplexing Using GT-UNI Switch." Electronics Letters, vol. 39, No. 10, May 15, 2003.

Uchiyama, Kentaro et al. "100-Gb/s Multiple-Channel Output All-Optical OTDM Demultiplexing Using Multichannel Four-Wave Mixing in a Semiconductor Optical Amplifier." IEEE Photonics Technology Letters, vol. 10, No. 6, Jun. 1998, pp. 890-892.

Wong, C.S. et al. "Polarization-Independent Time-Division Demultiplexing Using Orthogonal-Pumps Four-Wave Mixing." IEEE Photonics Technology Letters, vol. 15, No. 1, Jan. 2003, pp. 129-131.

Yongpeng, Zhao et al. "All-Optical OTDM Add/Drop Multiplexing using Semiconductor Optical Amplifier Based Mach-Zehnder Interferometer with Improved Extinction Ratio." Journal of Optical Communications, vol. 22, No. 4, Aug. 2001, pp. 122-126.

Porzi, C. et al. "Wide-Band Polarization-Independent Optical Time Demultiplexer based on Double-Pumped FWM in SOA." Conference on Lasers and Electro-Optics, 2004. May 16-21, 2004, vol. 1.

Zacharopoulos, I. et al. "Study of Polarization—Insensitive Wave Mixing in Bulk Semiconductor Optical Amplifiers." IEEE Photonics Technology Letters, vol. 10, No. 3, Mar. 1998, pp. 352-354.

* cited by examiner

MULTIPLEXER WITH APTICAL ADD/DROP

This invention relates to an innovative method and a multiplexer for realizing the extraction of channels in an OTDM (Optical-Time-Division-Multiplexed) or hybrid WDM/OTDM (Wavelength-Division-Multiplexed/Optical-Time-Division-Multiplexed) transmission system.

Extraction of a single channel and cleaning of the remaining channels in time-interleaved optical signals is a key characteristic for network operations in a WDM/OTDM type hybrid transmission system.

Semiconductor Optical Amplifiers (SOA) are the most important candidates for realizing this operation thanks to their compactness, integrability, optical band-width and high nonlinear effectiveness.

Various diagrams have been proposed in the art for realizing Add/Drop multiplexers (ADM) including SOAs. For example, diagrams have been proposed with two amplifiers included in a Mach-Zehnder Interferometer (MZI), a 2-way Four-Wave-Mixing (FWM) using a single SOA, and a Gain Transparent Amplifier (GT-SOA) in a nonlinear high-speed interferometer (UNI).

Diagrams both with MZI and with 2-way FWM require however two separate control signals for extraction and insertion operations respectively.

On the other hand, a nonlinear high-speed interferometer suffers from problems of optimization of the phase shifting at the high data speeds unless complex diagrams using polarization filters are employed, and it requires signals outside the band of the amplifier to avoid undesired gain modulation effects.

The general purpose of this invention is to remedy the above mentioned shortcomings by making available a method, a multiplexer and a complete OTDM transmission system with simultaneous extraction and cleaning of channels with a single commercial SOA and a single clock signal at the same speed as the data.

In view of this purpose it was sought to provide in accordance with this invention a multiplexer for performing Add/Drop operations on an OTDM optical signal including an inlet reached by the OTDM optical signal with wavelength $\lambda_d$, means of extraction and addition of a channel selected from the inlet OTDM signal, and an outlet of the OTDM optical signal cleaned after the Add/Drop operations and characterized in that the means of extraction include means of generation of optical impulses synchronized with said selected channel, an SOA into which the incoming OTDM is input and said synchronized optical impulses, an 'extractor' band-pass filter with band around a wavelength $\lambda_c$, outside the wavelength $\lambda_d$, and a 'cleaner' pass-band filter with band around the wavelength $\lambda_d$ arranged after the SOA, and with the wavelengths of the generator optical impulses being chosen in such a manner as to generate effects of FWM, XPM and XGM effects in the SOA that shift the signal of the selected channel to the wavelength $\lambda_c$ so that there is the extractor signal of the selected channel at the outlet of the extractor filter and at the outlet of the cleaner filter there is the OTDM signal cleaned from the selected channel signal.

Again in accordance with this invention it was sought to realize a method for extraction of a predetermined channel from an OTDM signal with said method including the steps of combining at the inlet of an SOA the OTDM signal and an impulsive signal with impulses temporally synchronized with the channel to be extracted to produce in the SOA effects of FWM, XGM and XPM that move to a length $\lambda_c$ the chosen channel for extraction with $\lambda_c$ outside the length $\lambda_d$ of the OTDM signal with the other channels output from the SOA and filter the output of the SOA to extract $\lambda_c \lambda_d$ components that represent respectively the desired channel and the cleaned OTDM signal.

Figure 2:
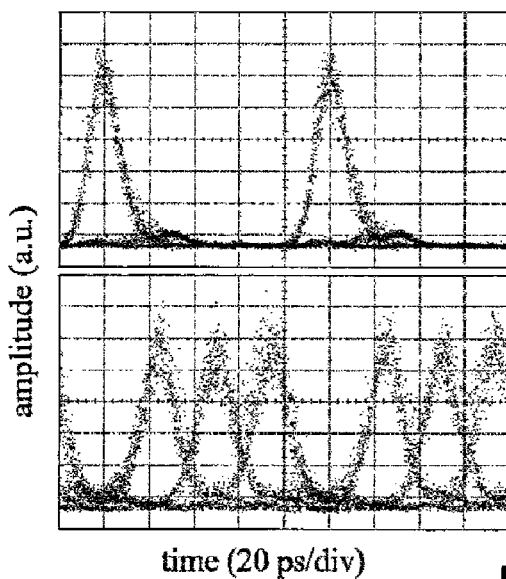
Figure 3:
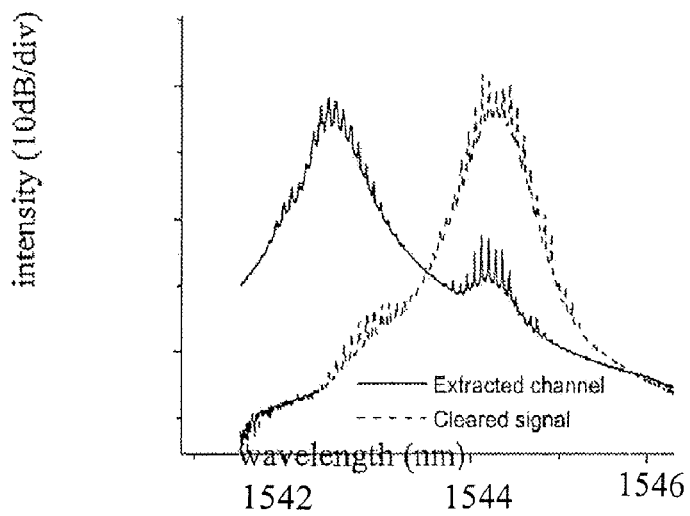
Figure 4:
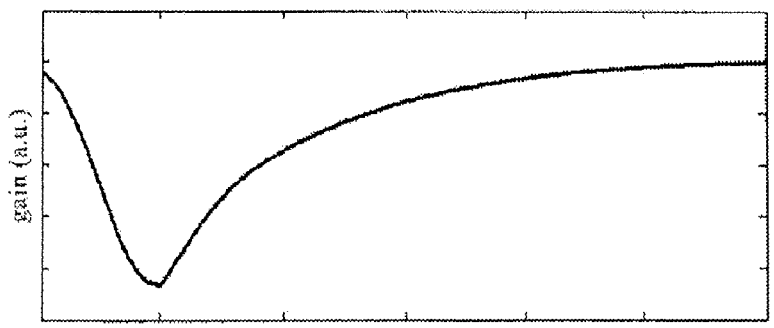
Figure 4:
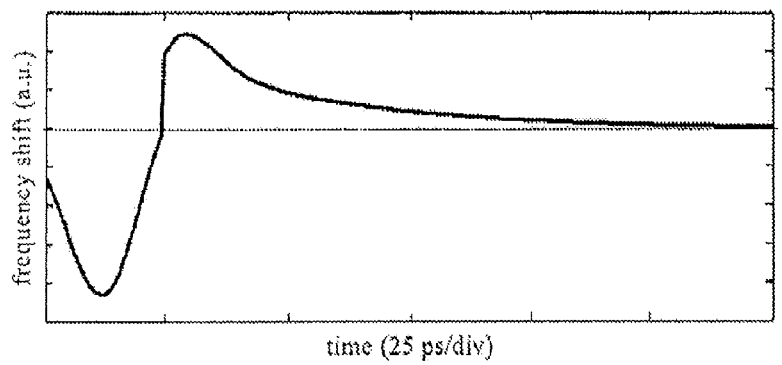
Figure 5:
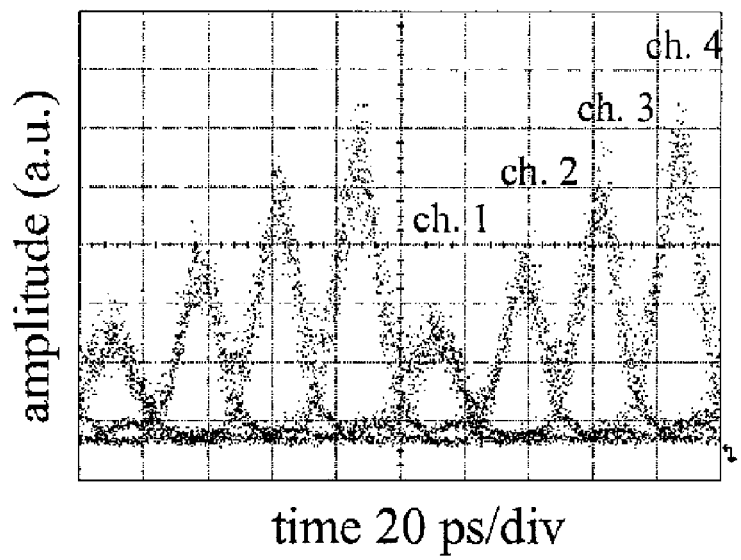
Figure 6:
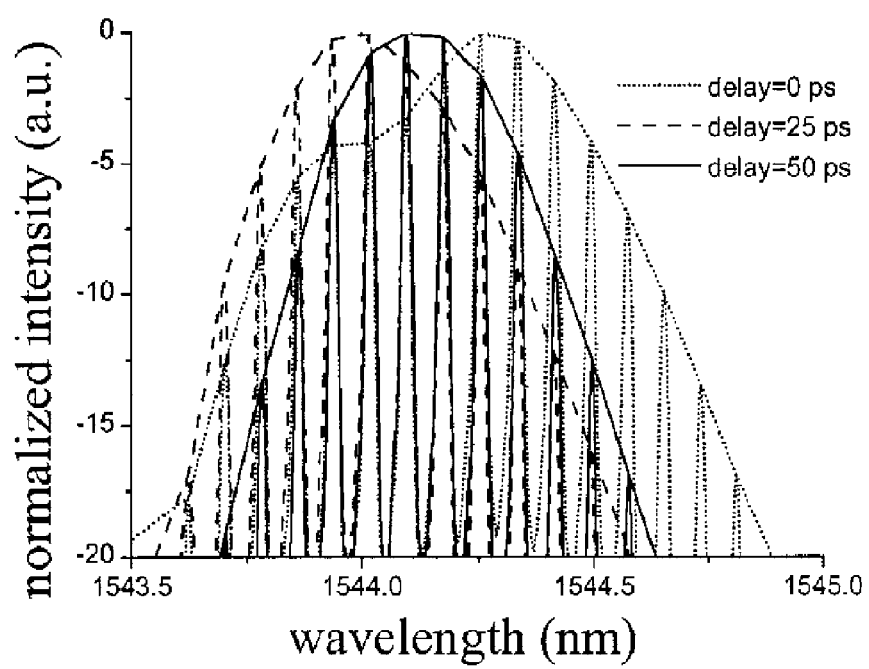
Figure 7:
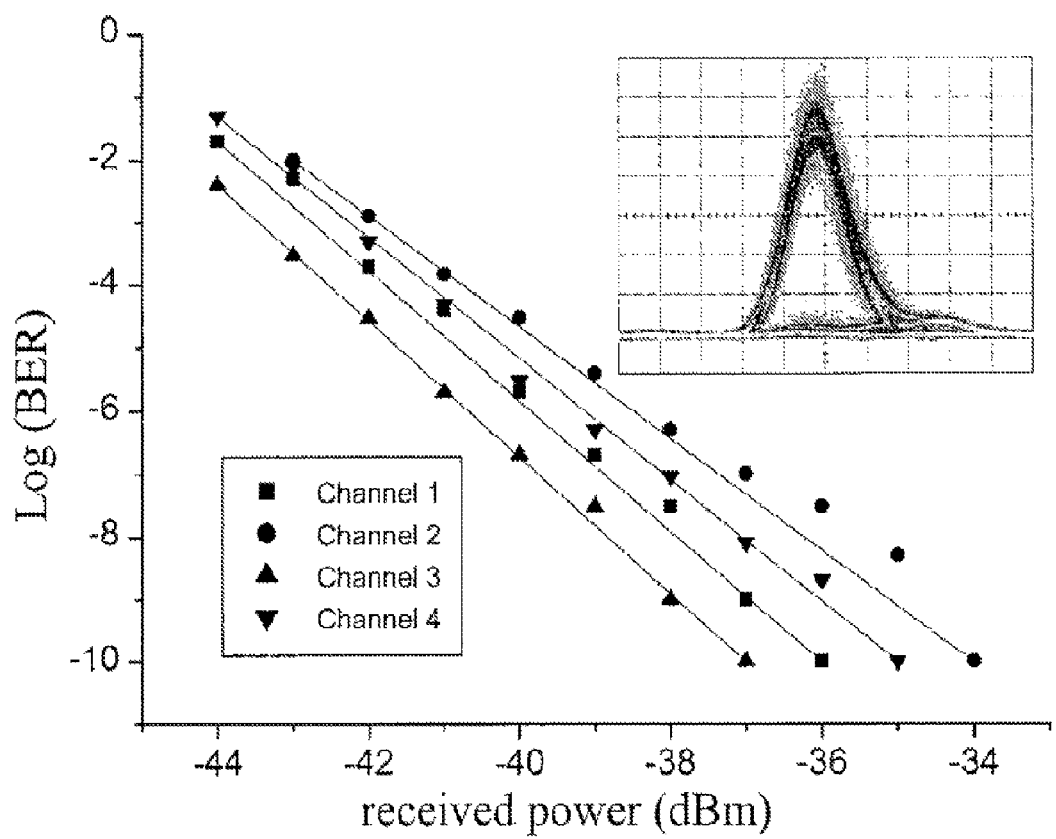

To clarify the explanation of the innovative principles of this invention and its advantages compared with the prior art there is described below with the aid of the annexed drawings a possible embodiment thereof by way of non-limiting example applying said principles. In the drawings:

FIG. 1 shows a block diagram of an ADM in accordance with this invention inserted in a transmission system including transmitter and receiver, FIG. 2 shows rough diagrams of an extracted channel and of the OTDM signal containing the remaining channels in the device in accordance with this invention, FIG. 3 shows the outlet spectrum of the extracted channel and of the OTDM signal with the remaining channels in the device in accordance with this invention, FIG. 4 shows numerical simulations that illustrate the trend of the gain transients and of frequency shift, FIG. 5 shows a rough diagram of the flow of output data affected by XGM, FIG. 6 shows the spectral movement for temporal delays of 0.25 ps and 0.50 ps, and FIG. 7 shows a graph of the bit error rate (BER) for each channel extracted as a function of the optical power received together with the measured rough diagram for the channel extracted.

With reference to the figures, FIG. 1 shows a block diagram of a transmission system designated as a whole by reference number 10 and realized in accordance with this invention with an optical Add/Drop Multiplexer (ADM) 11, a receiver 12 and a transmitter 13. The ADM has an inlet 14 and an outlet 15 for the main data flows. In addition, the ADM has a DROP outlet for the channel extracted that is connected at 16 to the inlet of the receiver 12 and an ADD inlet for the channel to be added that is connected at 17 to the outlet of the transmitter 13.

For the description of the operation of the system in accordance with this invention it is assumed that to the inlet 14 there arrives a 40 Gbits/s OTDM signal carrier divided in four channels/time slots at a wavelength $\lambda_d$.

As clarified below, even in the light of the embodiment of an ADM device in accordance with this invention the method in accordance with this invention for extraction of a channel from the complex signal and cleaning of the remaining channels is based on Four-Wave-Mixing (FWM) and Cross-Phase-Modulation (XPM) effects that are produced in an SOA when at its inlet is input the complex signal and a short and powerful impulse synchronized with the channel to be extracted. The FWM and XPM effects indeed produce respectively a wavelength conversion and a wavelength shifting that allow subsequent optical filtering at predetermined frequency of the channel it is wished to extract.

In greater detail, when a short and powerful optical impulse propagates in an SOA, the density of the carrier is modified instantly. After transit of the impulse, current injection contributes to recovering the density of the carrier in a time typical of the device. As a consequence of exhaustion and regeneration of the carrier a probe impulse following the strong impulse tests both an XGM (Cross Gain Modulation) and an XPM (Cross Phase Modulation).

In addition to the phase variation, even a frequency slip (chirp) $\Delta v$ is obtained in accordance with the equation:

$$\Delta v(\tau) = \frac{\alpha}{4\pi} \frac{\partial h}{\partial t}$$

where α is the "amplifier linewidth enhancement factor" and h is the integrated gain along the length of the SOA.

As clarified below, all this allows filtering and extraction of the channels in a totally optical manner.

With reference to the embodiment shown in FIG. 1, in the ADM in accordance with this invention there is a combiner member 23 that combines with the signal incoming to the ADM an appropriate impulsive signal produced locally and synchronized with the channel to be extracted. The outlet of the combiner 23 then sends to the inlet of the SOA 24.

To obtain the right impulse signal, an optical impulse source 18 such as a locally tunable Mode Locked Fiber Laser (MLFL) generating 5 ps optical impulses with a repetition frequency which is that of a single channel in the OTDM signal was used advantageously. In the case of the example, with a 40 Gbit/s carrier and four channels, the repetition frequency of the impulses of the source 18 is 10 GHz. The string of impulses is appropriately delayed by means of an optical delay line (ODL) 19 to synchronize it with the channel to be subjected to Add/Drop and is used as a control signal 20 for the Add/Drop operation as clarified below. A polarized laser CW 21 is combined in polarization by means of a PM combiner 22 with the signal 20 of the local impulse source to make the diagram independent of the polarization.

The wavelength $\lambda_I$ of the impulsive source 18 and the wavelength $\lambda_1$ of the laser 21 are chosen to be outside the band of the OTDM signal to allow their elimination after the SOA and to have the extracted channel converted to a desired $\lambda_c$ (outside the $\lambda_d$ of the OTDM signal) to which the extraction filter is set.

To have good efficiency of the system it was found that the following relation must be satisfied.

$$|\lambda_1 - \lambda_I| = |\lambda_d - \lambda_c|$$

In addition, to be able to perform the subsequent filtering operations after the SOA, $\lambda_I$ and $\lambda_1$ must be outside $\lambda_d$ and $\lambda_c$.

This leaves a certain degree of freedom in the choice of $\lambda_I$ and $\lambda_1$ that allows for example seeking special conditions of efficiency of the system in its practical realization. In the example, $\lambda_I$=1544,45 nm was chosen.

The data at the inlet 14 are then combined with the two local pump signals (20 and 21) by means of the combiner 23 and sent to the inlet of the SOA 24.

As an embodiment example, the mean signal powers at the amplifier inlet for the 10 GHz pump signal 20, the pump signal produced by the laser CW 21 and the data that enter at the inlet 14 are respectively 2.5 dBm, 5 dBm and 0 dBm. At the outlet of the SOA, an optical band-pass filter (OBPF) 25 with 5 nm band width and containing $\lambda_d$ and $\lambda_c$ while it suppresses the two pump signals.

The signal at the outlet of the filter 25 is amplified with an EDFA 26 and then divided by means of a splitter 27 towards two other optical band-pass filters 28 and 29 whose band-pass at 3 dB is approximately 0.4 nm. The filter 28 is centered at approximately $\lambda_d$ to extract the cleaned signal, i.e. deprived of the signal in the channel to be extracted. The filter 29 is centered at $\lambda_c$ (outside the band of the filter 28 and obtained from the wavelength conversion produced by the SOA on the channel to be extracted) and allows selection of the extracted channel and sending it to the outlet 16 of the ADM unit 11. If desired, the extraction filter 29 can also be realized tunable so as to allow more precision and/or variability in the choice of the wavelength of the pump signals (on which depends the wavelength to which the channel to be extracted is converted).

After extraction, there is a combiner 30 for addition of a channel input at the ADD inlet 17. The combiner 30 has its outlet connected to the outlet 15 and combines the signal at the outlet of the filter 28 with the inlet channel at 17 appropriately delayed by a second known optical delay line (ODL) 31 so as to insert it in place of the extracted channel.

To select the channel to be subjected to the Add/Drop operation, both the delay line 19 and the delay line 29 have adjustable delay that is commanded from an inlet 32 for selection of the channel to be extracted or added so as to take the string of probe impulses to be superimposed on the temporal slot of the channel to be extracted and, at the same time, temporally shift the channel to be added to take it to occupy the temporal slot left free by the extraction operation.

The receiver 12 has a known structure that includes a 10 Gbit/s RZ data and clock recovery stage (CDR) 32, a receiving stage 33 (that receives the data from the CDR 32) and a channel identifier 34 (that receives the data from the receiving stage 33) whose role is to set the appropriate delay for selection of the right OTDM channel both for channel add and channel extraction operations.

The clock signal 36 recovered from CDR 32 is sent both to the impulse generation stage 18 and to the transmitter 13 to allow the necessary synchronization.

The transmitter 13 has a known structure including an (MLFL/MLLD) optical source 39 pulsing at the repetition frequency of the channels (10 GHz in the example) synchronized with the data received by means of the clock signal 36, a known RZ/NRZ transmitter stage 37 and a known Mach-Zehnder modulator (MZ) 38, so as to produce at 17 the channel to be introduced in the data flow traversing the ADM.

By way of example, FIG. 2 shows rough diagrams of the extracted signals (above) and cleaned signals (below). FIG. 3 traces the corresponding outlet spectrum. Note the separation of the bands.

FIG. 4 shows the numerical simulation for the integrated gain (above) and the spectral shifting (below) for a 5 ps pump impulse. The spectral shifting is towards longer wavelengths (shifting towards red) and shorter (shifting towards blue) depending on whether the probe impulse is synchronous with or follows the clock impulse at the amplifier inlet.

This is due to the change of sign in the temporal derivative of the integrated gain. This effect is the basic principle behind the extraction (also termed 'cleaning') of the channels. The extracted channel is moved towards red as the effect of the decrease in gain while the following channels are moved towards blue opposite the gain/phase recovery. In particular, the channel nearest the pump impulse will test the highest sifting towards blue since the first part of the phase recovery curve is the most sloped.

FIG. 5 shows the rough diagram of the data flow outlet from the SOA and which tested the XGM. It can be noted that the channel synchronized with the pump button (channel 1 in the figure) tests the minimum gain while the width of the following channels (channel 2, channel 3 and channel 4) shows a gain recovery slope.

As proof of the effect on each individual channel and avoiding media effects of the spectrum analyzer, the experiment with the 40 Gbit/s data sequence at replaced by a string of 10 GHz impulses and measuring its spectrum at the amplifier outlet for different temporal delays was repeated.

In the experiment, the averaged power of the test signal was adjusted to have the same peak power for the individual impulse as in the preceding 40 Gbit/s experiment. The results are shown in FIG. 6. The impulse delayed by 0-ps (dotted) tests a shift towards longer wavelengths while the impulse (broken line) delayed by 25 ps (opposite the temporal slot of channel 2) is shifted towards shorter wavelengths. The figure also shows (solid line) the spectrum for the impulse delayed by 50 ps (channel 3) which is half-way between the other two situations because the easier gain recovery slope is easier for longer times. Despite this, this dependence on the temporal delay of the spectrum shifting allows re-equalizing the width of the channels (compare FIGS. 2 and 5) while positioning the central wavelength $\lambda_d$ opposite the shifted central wavelength of the least delayed impulse to obtain complete suppression of the extracted channel and equalization of the gain of the remaining signal.

With reference to the transmission diagram shown in FIG. 1 the BERs were measured at the outlet of the ADM for each of the four channels extracted. The figures found are drawn on the graph of FIG. 7 where the insert at the top shows the demultiplexed open rough diagram. As an indication, the diagram proposed as an example has a sensitivity of the lower receiver at 34 dBm for a BER=$10^{-9}$ and the power dispersion on the channels received is limited to less than 3 dB. In addition, the flow of cleaned data of the extracted channel preserves an open rough diagram as shown in FIG. 2.

The architecture used makes the diagram independent of polarization and wavelength thanks to the presence of two co-polarized pumps.

It is now clear that the preset purposes have been achieved by making available a method and a device allowing in a totally optical manner the operation of added extraction of channels in an OTDM system. The principle is to use both the FWM and the XPM effects in a single semiconductor optical amplifier with a subsequent selective optical filtering at the amplifier outlet. The device in accordance with this invention is insensitive to polarization and wavelength thanks to co-polarized pumps that aid the FWM in the optical amplifier. In conclusion, a new, compact, integrable and extremely simple diagram is presented for realizing extraction and cleaning operations at the same time.

Naturally the above description of an embodiment applying the innovative principles of this invention is given by way of non-limiting example of said principles within the scope of the exclusive right claimed here.

For example, results for a 40 Gbit/s OTDM signal are given but, on principle, the diagram is also suited for higher repetition rates.

In addition, the above described embodiment is related by way of example to an OTDM system operating at a single carrier wavelength. This invention can however be applied also to a hybrid WDM-OTDM system in which a plurality of OTDM signals of respective carrier wavelength are transmitted along a fiber. In this case, the individual OTDM carriers will be extracted in accordance with any prior art method and then each one will be sent to an ADM in accordance with this invention adjusted for the wavelengths of the specific carrier. At the outlet of the ADM the carriers will be recomposed in the WDM signal. All this is realizable in practice just for the relative simplicity and compactness of an ADM in accordance with this invention.

The invention claimed is:

1. A multiplexer for performing Add/Drop operations on an Optical Time Division Multiplexed (OTDM) optical signal, the multiplexer comprising:
   an input configured to receive an OTDM optical signal having a wavelength of $\lambda_d$;
   an extractor configured to extract a selected channel from the OTDM signal received at the input and to clean the OTDM signal of the selected channel, the extractor comprising:
      an optical generator configured to generate optical impulses synchronized with the selected channel;
      a Semiconductor Optical Amplifier (SOA) configured to receive the OTDM signal and the synchronized optical impulses and having an output;
      an extractor band-pass filter connected to the SOA output, the extractor filter having a pass band around a wavelength $\lambda_c$ that is outside the wavelength $\lambda_d$ of the received OTDM signal;
      a cleaner band-pass filter connected to the SOA output, the cleaner filter having a pass band around the wavelength $\lambda_d$;
      wherein the wavelengths of the generated optical impulses are selected so as to generate Four-Wave-Mixing (FWM) effects, Cross-Phase-Modulation (XPM) effects, and Cross-Gain-Modulation (XGM) effects at the SOA to shift the selected channel signal to the wavelength $\lambda_c$ such that the extractor band-pass filter outputs a signal to be extracted from the selected channel, and such that the cleaner band-pass filter removes from the OTDM signal the signal to be extracted, and outputs a cleaned OTDM signal;
      wherein the optical generator comprises:
         a first source configured to generate the optical impulses with a frequency that is equal to a frequency of repetition of a channel in the received OTDM signal; and
         a polarized laser having an emission that is combined with delayed impulses output by the first source so as to produce optical impulses with two co-polarized pumps, and wherein the effects in the SOA are substantially independent of a polarization of the incoming OTDM signal.

2. The multiplexer of claim 1 further comprising:
   a first combiner configured to add a channel to the cleaned OTDM signal; and
   an output configured to output the OTDM signal after the Add/Drop operations performed by the channel extractor and the combiner.

3. The multiplexer of claim 1 wherein the first source is configured to generate the optical inputs with a wavelength of $\lambda_l$, and wherein the polarized laser has a wavelength of $\lambda_1$, with $\lambda_l$ and $\lambda_1$ being selected to be outside the wavelengths $\lambda_d$ and $\lambda_c$, and such that:

$$|\lambda_1 - \lambda_l| = |\lambda_d - \lambda_c|.$$

4. The multiplexer of claim 1 wherein the optical impulse generator further comprises an optical delay line configured to delay the impulses generated by the first source such that the delayed optical impulses coincide with a temporal slot of the channel to be extracted.

5. The multiplexer of claim 1 further comprising a third band-pass filter disposed between the SOA output and the extractor and cleaner band-pass filters, the third band-pass filter being configured to:
   pass bands having wavelengths of $\lambda_d$ and $\lambda_c$; and
   eliminate the optical impulses of the optical impulse generator traversing the SOA.

6. The multiplexer of claim 5 further comprising an Erbium Doped Fiber Amplifier (EDFA) disposed between the third filter output and the extractor and cleaner band-pass filters.

7. The multiplexer of claim 4 wherein the first combiner comprises an adjustable optical delay line configured to:

receive a channel to be added;

send the channel as a delayed channel signal to a second combiner configured to combine the delayed channel signal with the cleaned OTDM signal; and the adjustable optical delay line being controlled to cause the channel to be added to coincide with a temporal slot of the extracted channel.

8. The multiplexer of claim 7 further comprising a channel selector configured to select the channel for the Add/Drop operation by producing a channel selection signal that is sent to both the adjustable optical impulse delay line and the optical delay line.

9. The multiplexer of claim 8 wherein the selection signal is configured to delay the adjustable optical impulse delay line and the optical delay line to synchronize the signals with their respective inputs to the temporal slot of the channel selected for the Add/Drop operation.

10. A method of extracting a predetermined channel from an Optical Time Division Multiplexed (OTDM) optical signal, comprising:

at an input of an Semiconductor Optical Amplifier (SOA), combining an OTDM signal and an impulse signal with impulses temporally synchronized to a channel selected to be extracted, to produce Four-Wave-Mixing (FWM) effects, Cross-Phase-Modulation (XPM) effects, and Cross-Gain-Modulation (XGM) effects in the SOA such that the FWM, XPM, and XGM effects shifting the wavelength of the selected channel to a wavelength $\lambda_c$ that is outside the wavelength of $\lambda_d$ of the OTDM signal;

filtering the SOA output to extract components having wavelengths of $\lambda_c$ and $\lambda_d$ that represent the selected channel and a cleaned OTDM signal, respectively; and combining first and second co-polarized signal sources to generate the impulse signal, wherein at least one of the signal sources generates an impulse signal that is synchronized with the selected channel to be extracted, and wherein the FWM, XPM, and XGM effects at the SOA are substantially independent of a polarization of the incoming OTDM signal.

11. The method of claim 10 wherein the first co-polarized signal source generates the impulse signal having a wavelength of $\lambda_I$ and wherein the second source co-polarized signal source comprises a laser polarized at a wavelength of $\lambda_1$, with $\lambda_I$ and $\lambda_1$ selected to be outside the wavelengths of $\lambda_d$ and $\lambda_c$, and such that:

$$|\lambda_1 - \lambda_I| = |\lambda_d - \lambda_c|.$$

12. The method of claim 10 further comprising band-pass filtering the output of the SOA prior to extracting the components with wavelengths of $\lambda_c$ and $\lambda_d$, to pass the wavelength $\lambda_c$ and $\lambda_d$ signals and remove the impulse signal traversing the SOA.

13. The method of claim 10 further comprising repeating and temporally delaying the optical impulse signals having a frequency equal to a repetition frequency of a channel in the OTDM signal to superimpose them on a temporal slot of the selected channel.

14. The method of claim 13 wherein temporally delaying the optical impulse signals comprises:

delaying a signal to be added to a channel of the OTDM signal to replace the extracted channel, and to cause the signal to coincide with the temporal slot of the extracted channel; and combining the signal to be added with the cleaned OTDM signal.

* * * * *

UNITED STATES PATENT AND TRADEMARK OFFICE
CERTIFICATE OF CORRECTION

PATENT NO. : 7,869,713 B2  Page 1 of 1
APPLICATION NO. : 11/720667
DATED : January 11, 2011
INVENTOR(S) : Porzi et al.

It is certified that error appears in the above-identified patent and that said Letters Patent is hereby corrected as shown below:

On the title page, item (54), in Title, in Column 1, Line 1, delete "APTICAL" and insert -- OPTICAL --, therefor.

In Column 1, Line 1, delete "APTICAL" and insert -- OPTICAL --, therefor.

Signed and Sealed this
Eighth Day of November, 2011

David J. Kappos
*Director of the United States Patent and Trademark Office*